(12) United States Patent
Wu

(10) Patent No.: US 11,099,881 B2
(45) Date of Patent: Aug. 24, 2021

(54) RESTORE HOSTED NETWORK WHILE RESTORING A VIRTUAL MACHINE IN A HOSTED HYPERVISOR ENVIRONMENT

(71) Applicant: VMware, Inc., Palo Alto, CA (US)

(72) Inventor: Junfei Wu, Beijing (CN)

(73) Assignee: VMware, Inc., Palo Alto, CA (US)

( * ) Notice: Subject to any disclaimer, the term of this patent is extended or adjusted under 35 U.S.C. 154(b) by 74 days.

(21) Appl. No.: 16/535,644

(22) Filed: Aug. 8, 2019

(65) Prior Publication Data

US 2021/0019165 A1 Jan. 21, 2021

Related U.S. Application Data

(63) Continuation of application No. PCT/CN2019/095971, filed on Jul. 15, 2019.

(51) Int. Cl.
*G06F 9/455* (2018.01)

(52) U.S. Cl.
CPC ............ *G06F 9/45558* (2013.01); *G06F 2009/45562* (2013.01); *G06F 2009/45595* (2013.01)

(58) Field of Classification Search
CPC ....... G06F 9/45558; G06F 2009/45562; G06F 2009/45595
See application file for complete search history.

(56) References Cited

U.S. PATENT DOCUMENTS

| | | | | |
|---|---|---|---|---|
| 8,966,027 B1* | 2/2015 | Brandwine | ......... | H04L 61/2503 709/221 |
| 2010/0031079 A1* | 2/2010 | Gupta | ................. | G06F 11/1433 714/4.1 |
| 2014/0365822 A1* | 12/2014 | Tarves, Jr. | .......... | G06F 11/1484 714/15 |
| 2017/0031704 A1* | 2/2017 | Sudhakaran | .......... | G06F 16/128 |

\* cited by examiner

*Primary Examiner* — Dong U Kim
(74) *Attorney, Agent, or Firm* — Patterson + Sheridan, LLP

(57) ABSTRACT

A method and system are provided for restoring a virtual machine. A snapshot of the virtual machine is taken where the snapshot includes stored configuration information regarding a hosted network used by the virtual machine. In one embodiment, the virtual machine is restored, and a hosted network that has a type similar to the hosted network for the virtual machine is found. In another embodiment, a new hosted network having a type of the hosted network for the virtual machine is created. The vNICs of the virtual machine are modified to operate with the similar or newly created hosted network. If the hosted network for the virtual machine is a custom hosted network, then a similar or new hosted network is found or constructed having the same parameters as the custom hosted network.

19 Claims, 7 Drawing Sheets

RESTORE HOSTED NETWORK WHILE RESTORING A VIRTUAL MACHINE IN A HOSTED HYPERVISOR ENVIRONMENT

RELATED APPLICATIONS

The present Application claims priority to International Application Serial No. PCT/CN2019/095971, filed Jul. 15, 2019, entitled "RESTORE HOSTED NETWORK WHILE RESTORING A VIRTUAL MACHINE IN A HOSTED HYPERVISOR ENVIRONMENT," which is assigned to the assignee hereof, and expressly incorporated herein by reference.

BACKGROUND

Virtualizing software running on host computing devices provide a virtual environment for virtual computing instances (VCIs), such as virtual machines (VMs), containers, etc., each of which owns and uses certain resources such as virtual storage, virtual CPUs, and virtual memories along with many other virtual devices that are backed by physical resources of the host computing devices. Certain aspects are described herein with respect to VMs, but may also be applicable to other types of VCIs.

Such virtualizing software usually provides a way for taking and restoring snapshots (e.g., backups) of the VMs running on the virtualizing software. For example, the virtualizing software takes a snapshot of a VM and stores the snapshot as a file in storage. The snapshot corresponds to a state of the VM at the time the snapshot is taken. The VM may continue to run and be modified. At a later time, the virtualizing software may restore the VM to its previous state using the stored snapshot. In another example, the snapshot may be used to instantiate the VM on virtualizing software of a different host computer system.

A snapshot of a VM records the resources owned or used by the VM so that they can be restored when the VM is restored. In some embodiments, resources used by a VM are shared with one or more other VMs. Shared resources include virtual spooled devices (e.g., a printer), virtual network adapters, virtual switches, and virtual networks, each of which is a virtualized version of its physical counterpart. A virtual network adapter in each VM has a virtual state which is related to the usage of the adapter by the VM and which is maintained by the virtualization software.

A virtual switch, which can be used by many VMs, includes several function units, such as a Layer 2 forwarding engine, which processes Layer 2 Ethernet headers, tagging, stripping and filtering units, and Layer 2 security, checksum and segmentation offload units. The virtual switch may also be configured with forwarding tables and provide tunneling services and encapsulation services to permit communication independently of any underlying physical networks. The virtual switch may have many ports, where each port provides logical connection points among the virtual network adapters and between the virtual and physical network adapters to which the virtual switch is connected. When a virtual switch is built, ports of the virtual switch are configured for specific physical and virtual network adapters. Virtual switches are often limited to a single-tier networking topology and a single virtual switch on a host computer system so that only the VMs on the host computer system can use the virtual switch.

A virtual network, also referred to as a hosted network, arises from a combination of virtual network adapters, virtual switches and physical network adapters so that VMs, which are connected to the virtual network, can communicate with each other or an external network outside of the host computing device.

However, when a snapshot of a VM is recorded, configurations of the virtual network adapters for any of the virtual networks that the VM is using are not recorded in the snapshot. Consequently, if a VM is restored from a recorded snapshot and finds itself in a different environment, for example, a host computer system with different virtual switches and different virtual networks, the virtual network adapters often cannot connect to the virtual network in the new environment because the virtual network adapters have a configuration that is incompatible with that virtual network. It is thus desirable to avoid the likely inability of the VM to connect to the virtual network in a different environment when the VM is restored from the recorded snapshot so that the restored VM can function as it did prior to the snapshot.

SUMMARY

Embodiments described herein take a snapshot for the virtual environment not only for the virtual machine but also for virtual network adapters for the virtual network, which is also called a hosted network. When the virtual machine is restored, the virtual network that was used by the virtual machine is also restored, or an equivalent one is either found or constructed.

One embodiment is a method for restoring a virtual machine. The method includes restoring the virtual machine from a recorded snapshot of the virtual machine, wherein the recorded snapshot includes stored configuration information regarding a hosted network used by the virtual machine, the stored configuration information including parameters that describe properties of the hosted network used by the virtual machine, and wherein the restored virtual machine includes one or more virtual network interface controllers (vNICs) configured to be connected to the hosted network, and restoring the hosted network used by the virtual machine based on the stored configuration information, wherein the restoring includes determining whether any hosted network is available that supports a configuration of the one or more vNICs of the restored virtual machine.

Another embodiment is a computer system configured to carry out one or more aspects of the above method. Yet another embodiment is a computer program product that includes a computer readable storage medium containing computer-readable code executable by one or more computer processors to carry out one or more aspects of the above method.

DETAILED DESCRIPTION

Embodiments described herein provide for the storing of additional configuration information in a snapshot of a virtual machine, where the additional configuration includes information pertaining to the type of hosted network to which virtual network adapters of the virtual machine were connected at the time of the snapshot. When the virtual machine is restored in a host computer system environment different from that in which it was running at the time of a snapshot, the additional information permits procedures in the virtualization software to restore the virtual network adapters of the virtual machine to a condition that allows them to connect to virtual switches of the hosted network so that they can connect to the hosted network in the different environment. Thus, the embodiments assure, in most cases, that restoration of a virtual machine is complete in that not only will the virtual machine be restored with its memory and devices at the time of the snapshot but also that the virtual machine can operate with a hosted network present in the different environment that may not be identical to the one it operated with at the time of the snapshot. This more complete restoration of the virtual machine allows for the functioning of the virtual machine in a greater variety of host environments and allows greater mobility of the virtual machine.

Figure 1:
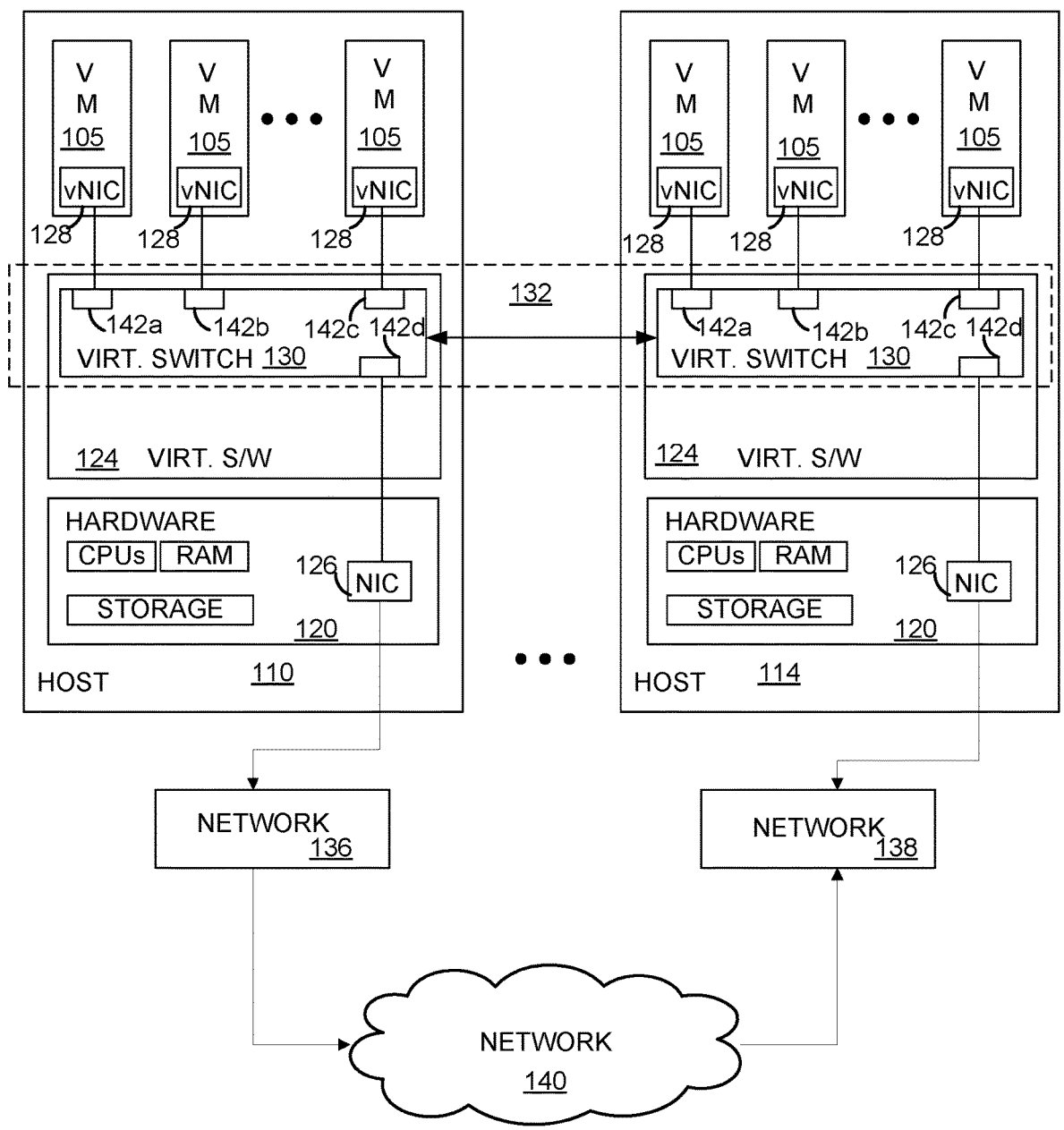
FIG. 1 depicts a block diagram of a computer system that is representative of a computer system in which embodiments may be implemented.

FIG. 1 depicts a block diagram of a computer system 100 that is representative of a computer system in which embodiments may be implemented. In FIG. 1, system 100 includes a plurality of hosts 110, 114 collectively known as a cluster. Each host 110, 114 includes hardware 120, virtualization software 124, and a plurality of virtual machines (VMs) 105.

Hardware 120 of each host 110, 114 includes one or more CPUs, a system memory, which is a general volatile random access memory (RAM), a storage system, and a physical Network Interface Controller (NIC) 126, which may be an Ethernet network interface or similar interface.

Virtualization software 124 in each host 110, 114, is sometimes referred to as a hypervisor and includes software components for managing hardware resources and software components for virtualizing physical devices to provide virtual devices, such as virtual disks, virtual CPUs, virtual network interfaces for each VM 105.

Virtualization software 124 architecture may vary. In some embodiments, virtualization software can be installed as system level software directly on the server hardware (often referred to as "bare metal" installation) and be conceptually interposed between the physical hardware and the guest operating systems executing in the virtual machines. Alternatively, the virtualization software 124 may conceptually run "on top of" a conventional host operating system in the host computer system. In some implementations, the virtualization software 124 may comprise system level software as well as a "Domain 0" or "Root Partition" virtual machine, which is a privileged machine that has access to the physical hardware resources of the host. In this implementation, a virtual switch, along with hardware drivers, may reside in the privileged virtual machine.

Virtualization software 124 includes a virtual switch 130. Virtual switch 130 is managed by virtualization software 124 and includes a number of ports 142a-d to which virtual network adapters, such as virtual network interface controllers (vNICs) 128 and NIC 126 can connect. Virtual switches 130 in each host computer system, which are coupled together, can combine to form a virtual network 132, which is an example of a hosted network.

Virtual network 132, which is a virtualization of a physical network, may provide a virtual Layer 2, or a data link layer, services such as encapsulation of network layer data packets into frames, frame synchronization, and media access control, among other things. Virtual network 132 may span one or more physical networks and may be organized independently of the underlying physical topology and organization of the physical networks. In the representative system 100, virtual network 132 spans a first network 136 that includes host 110 and a second network 138 that includes host 114. First and second networks 136 and 138 may be different subnets on the same physical network, connected via routers, virtual private network (VPN), and/or switches (not shown), or as shown, may be networked via network 140, which may include the Internet. Virtual switches 130 are configured to implement virtual network 132, such that VMs 105 coupled to virtual switches 130 via vNICs 128 are able to communicate as though coupled to the same physical Layer-2 network, even if on different hosts 110 and 114. Virtual network 132 to which VM 105 is connected is hereinafter referred to as a hosted network 132 of VMs 105.

In representative system 100, each VM 105, which is a virtualization of a physical computer system, may include an operating system (OS), such as the Microsoft Windows® operating system, and applications, which are referred to as the "guest OS" and "guest applications" respectively, where the term "guest" indicates a software entity that resides within VMs 105. Virtualization software 124 may be implemented wholly or in part in hardware, e.g., as a system-on-a-chip, firmware, or FPGA. Each VM 105 in representative system 100 may include one or more virtual network interface controllers, vNICs 128, which are coupled to virtual switch 130. vNICs 128 are responsible for exchanging packets between VM 105 and virtual switch 130. It should be noted that a VM 105 may have a plurality of vNICs 128, which may respectively couple VM 105 to a plurality of hosted networks 132.

Figure 1A:
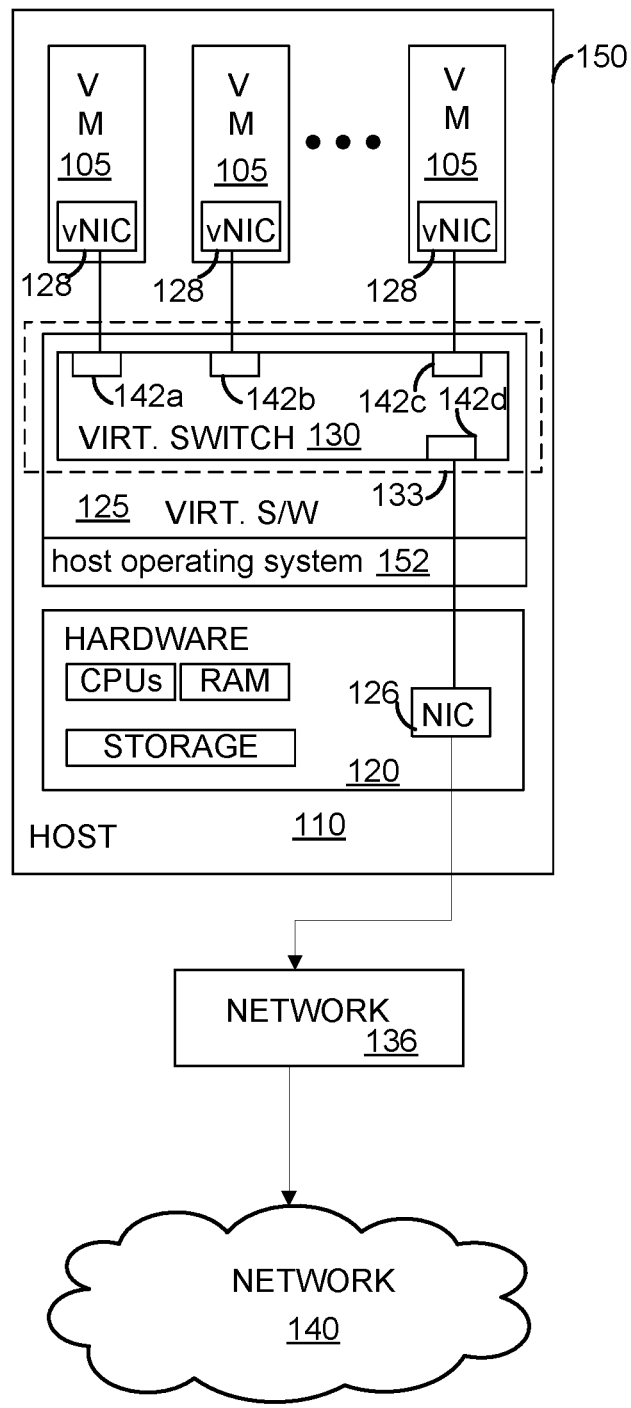
FIG. 1A depicts a block diagram of another computer system that is representative of a computer system in which embodiments may be implemented.

FIG. 1A depicts a block diagram of another computer system that is representative of a computer system in which embodiments may be implemented. System 150 in FIG. 1A includes a host 110 having a virtual switch 130 connectable via port 142d to a physical NIC 126, which connects to an external local-area network 136, which may, in turn, connect to a wide-area network such 140, such as the Internet. In FIG. 1A, hosted network 133 comprises a virtual switch 130. Also in FIG. 1A, node 152 has virtualization software 125 running on an operating system 152 instead of running directly on the server hardware as in FIG. 1. Accordingly, the configuration in FIG. 1A is an example of a hosted hypervisor environment. In certain embodiments, techniques describe herein are configured to operate in such a hosted hypervisor environment.

Figure 2A:
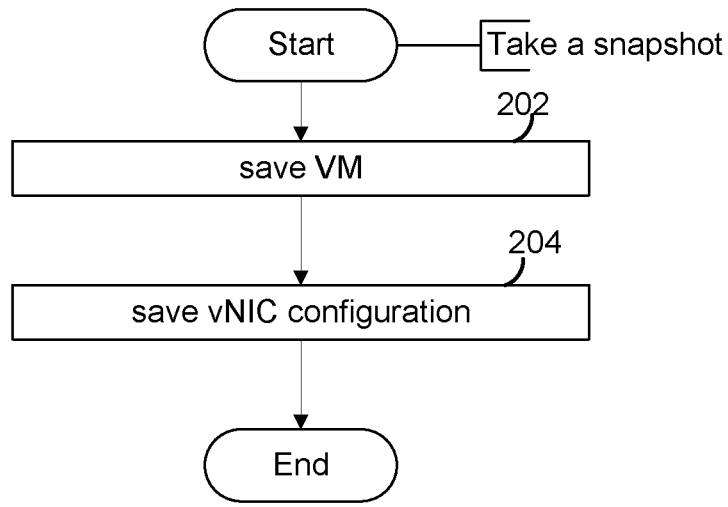
FIG. 2A depicts a flowchart of operations for a procedure that takes a snapshot, in an embodiment.

FIG. 2A depicts a flowchart of operations for a procedure that takes a snapshot, in an embodiment. In step 202, virtualization software 124, 125 captures the entire state of VM 105 and stores the result in a database file (e.g., a .vmsd file) in persistent storage accessible by hardware 120 of host 110, 114. Capturing the entire state of VM 105 includes capturing the state and data of a VM at a specific point in time, where the state includes the power state (e.g., powered-on, powered-off, suspended) of VM 105. The data includes all of the files that make up VM 105, e.g., virtual disks, virtual machine memory, and other devices owned by VM 105. Specifically, in step 204, the configurations of any vNICs 128 of VM 105, which is one of the devices owned by VM 105, are saved into the snapshot. Saving vNIC 128 configuration includes saving several parameters, such as one or more conventional parameters, and one or more additional parameters for VM 105. Examples of the conventional and additional parameters are depicted in Table 1 below. In certain aspects, such parameters are specifically for a hosted hypervisor environment, such as described with respect to FIG. 1A.

TABLE 1

| Parameter recorded in snapshot | Conventional/Additional |
|---|---|
| ethernet1.present = 'TRUE' | Conventional |
| ethernet1.connectionType = 'custom' | Conventional |
| ethernet1.addressType = 'generated' | Conventional |
| ethernet1.virtualDev = 'e1000' | Conventional |
| ethernet1.vnet = 'vmnet3' | Conventional |
| ethernet1.vnet.dhcp = 'TRUE" | Additional |
| ethernet1.vnet.nat = 'TRUE' | Additional |
| ethernet1.vnet.hostConnection = 'TRUE' | Additional |

The conventional parameter, 'ethernet1.present' indicates the presence or absence of a hosted network 132, 133 such as a virtual Ethernet network. The parameter, 'ethernet1.connectionType' indicates the type of connection to hosted network 132, 133. The parameter, 'ethernet1.addressType' indicates the address type for hosted network 132, 133. The parameter, 'ethernet1.virtualDev' indicates that the device is an emulated version of E1000, which is the Intel 82574 Gigabit Ethernet Adapter. The parameter, ethernet1.vnet, indicates a configuration type of hosted network 132, 133. Common types are (1) bridged, which allows a VM 105 to have direct access to an external network, (2) host-only, which allows communication only between VMs 105 on host machine 110, and (3) network address translation (NAT), in which VM 105 and host system 110 share a single network identity that is not visible outside the hosted network 132, 133. In certain aspects, such types are common specifically in a hosted hypervisor environment, such as described with respect to FIG. 1A. In certain aspects, these or other types may be available in other hypervisor environments. Often, these common types are available as the default, or built-in, networks, on virtualization software 124, 125 installed on any host 110. The first additional parameter, ethernet1.vnet.dhcp, indicates whether or not the DHCP service is enabled for hosted network 132, 133. The second additional parameter, ethernet1.vnet.nat, indicates whether 'NAT' is enabled for hosted network 132, 133. The third additional parameter, ethernet1.vnet.hostConnection, indicates whether 'connect host' is enabled for hosted network 132, 133. If 'connect host' is enabled, the VM 105 can 'ping' an address of a vNIC 128 if the vNIC 128 has been connected to the hosted network 132, 133. If not enabled, then the VM 105 can access locations outside of the hosted network 132, 133 but cannot communicate with other VMs 105 connected to the hosted network 132, 133. The additional parameters have a Boolean value of 'TRUE' or 'FALSE.' For example, the parameter ethernet1.vnet.dhcp="TRUE" if hosted network 132, 133 implemented by virtual switch 130 to which the vNIC 128 is coupled has DHCP enabled; otherwise, it is false. The parameter ethernet.vnet.nat='TRUE' if hosted network 132, 133 has NAT enabled; otherwise, it is 'FALSE'. The parameter ethernet.vnet.hostConnection is 'TRUE' if hosted network 132, 133 has hosted connection enabled; otherwise, it is 'FALSE'.

Figure 2B:
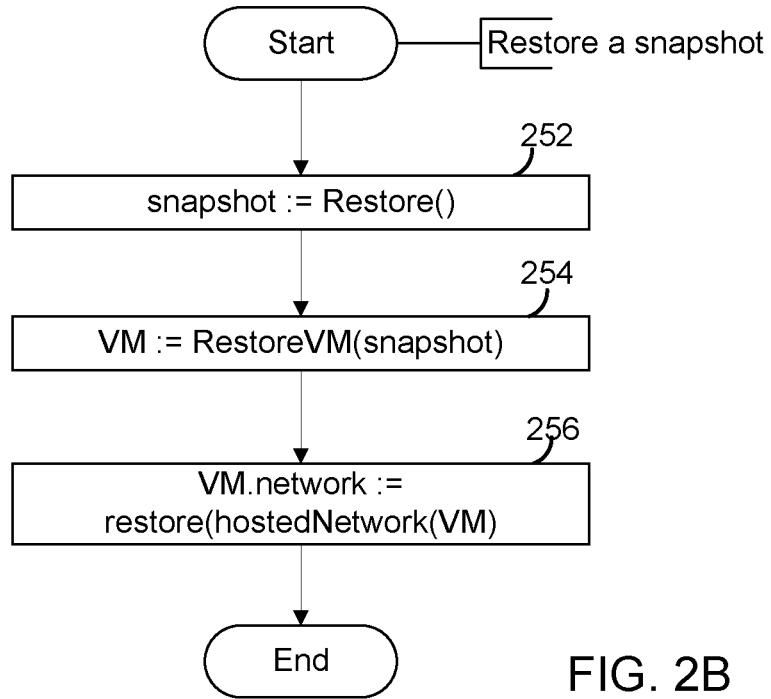
FIG. 2B depicts a flowchart of operations for a procedure that restores a snapshot, in an embodiment.

FIG. 2B depicts a flowchart of operations for a procedure that restores a snapshot, in an embodiment. In step 252, virtualization software 124, 125 restores the snapshot from persistent storage in hardware 120 of host 110, 114. In step 254, virtualization software 124, 125 restores VM 105 using the snapshot. In step 256, the process restores hosted network 132, 133 used by VM 105. Step 256 is described in further detail in reference to FIG. 3.

Figure 3:
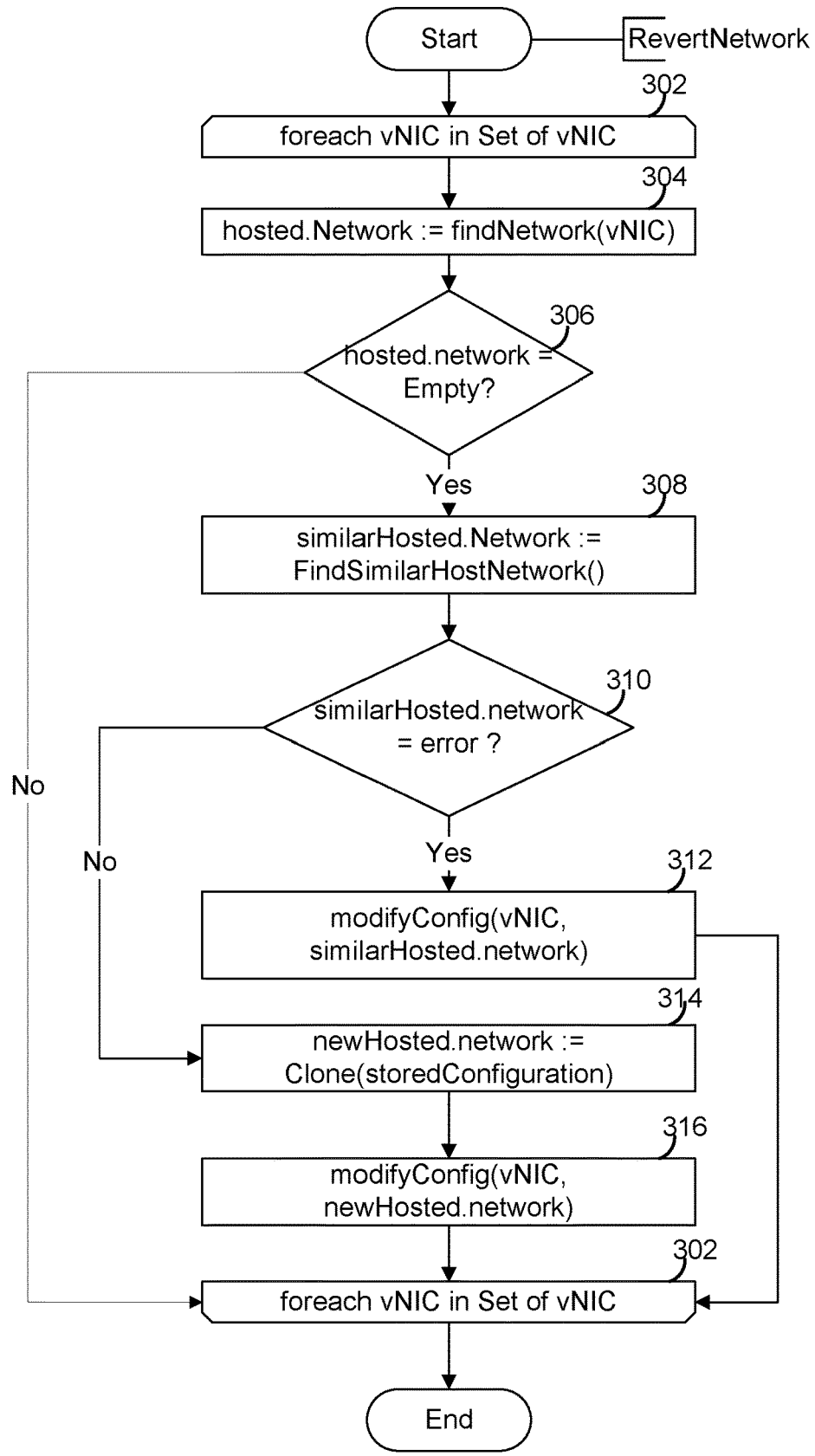
FIG. 3 depicts a flowchart of operations for a procedure that restores a hosted network for a virtual machine, in an embodiment.

FIG. 3 depicts a flowchart of operations for a procedure that restores a hosted network for a virtual machine. In step 302, virtualization software 124, 125 starts an iterator for each vNIC 128 in the set of vNICs 128 of VM 105. As discussed, each vNIC 128 may be associated with a hosted network 132, 133. In step 304, virtualization software 124, 125 determines whether, for the current vNIC 128 in the iteration, a component involved in implementing its associated hosted network, such as a virtual switch 130, is present. If, as determined in step 306, hosted network 132, 133 for vNIC 128 is not present, then virtualization software 124, 125 proceeds to step 308 to perform a function to obtain a substitute network, which in this case is finding a similar hosted network. Otherwise, a hosted network matching vNIC 128 is present, and the procedure iterates to the next vNIC 128. The function of finding a similar hosted network is further described in reference to FIG. 4. If, as determined in step 310, a similar hosted network is present, then virtualization software 124, 125 invokes a modify function in step 312 which modifies vNIC 128 to connect to the similar hosted network 132, 133. The modify function in step 312 is further described in reference to FIG. 6. If, as determined in step 310, a similar hosted network is not present, then in step 314, virtualization software 124, 125 performs a function to obtain a substitute network, which in this case is cloning a new hosted network based on a stored configuration. The cloning function in step 314 is further described in reference to FIG. 5. In step 316, virtualization software 124, 125 performs a modify function to modify (FIG. 6) vNIC 128 to connect to the new hosted network. Virtualization software 124, 125 continues the iteration until all vNICs 128 of VM 105 are examined.

Figure 4:
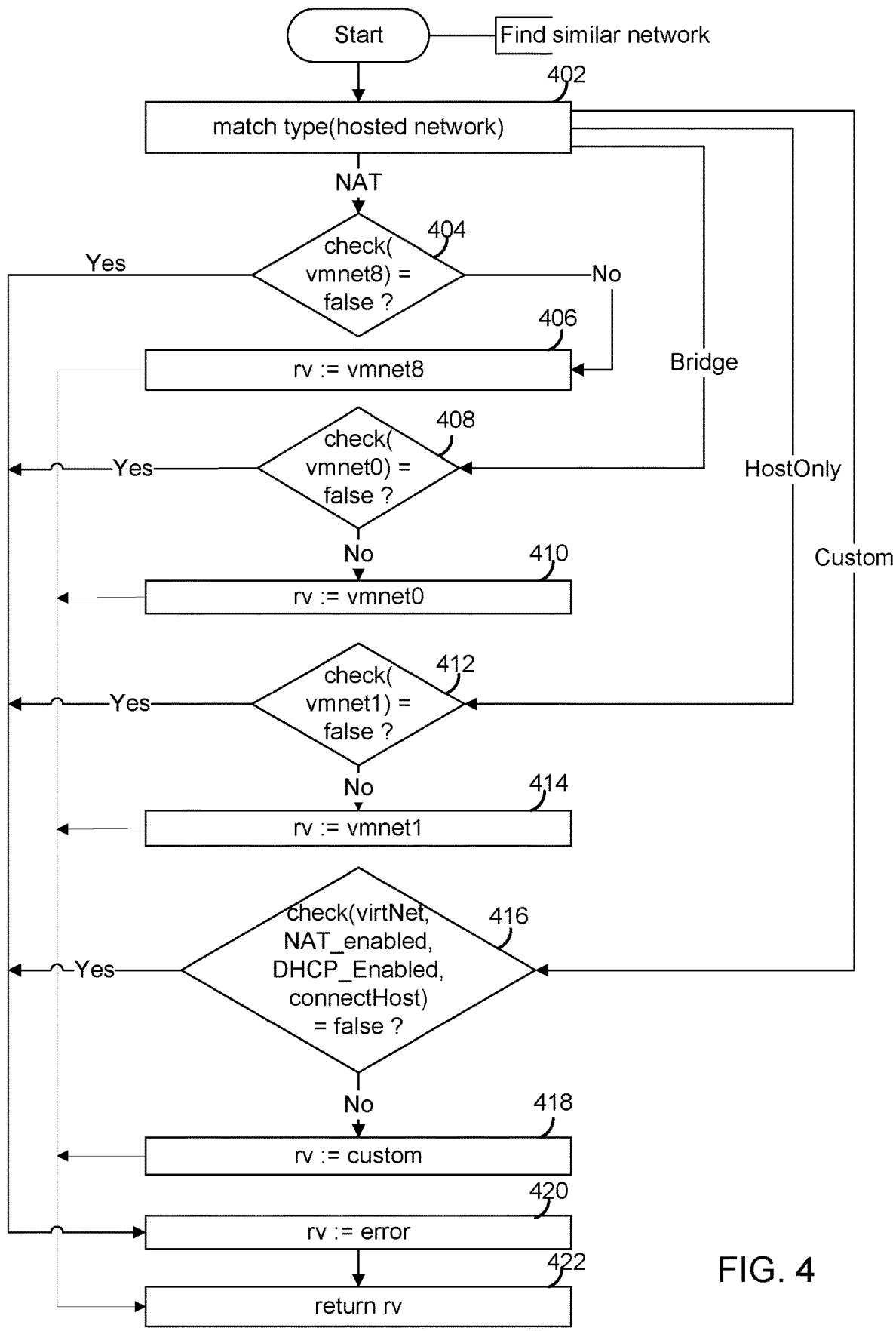
FIG. 4 depicts a flowchart of operations for a function that finds a similar hosted network, in an embodiment.

FIG. 4 depicts a flowchart of operations for a function that finds a similar hosted network, in an embodiment. In step 402, the function determines, by examining vNIC 128 configuration information in the snapshot, the type of hosted network to which vNIC 128 of the VM 105, which is being restored, was connected. If the type of hosted network is 'NAT', then in step 404, the function checks whether a built-in hosted network of type 'NAT', such as vmnet8, is present on the host including vNIC 128. If so, then in step 406 function sets a return value, rv, e.g., equal to the 'vmnet8', which becomes the value of 'similarHosted.Network' in step 308 of FIG. 3. If the type is 'Bridge', then in step 408, the function determines whether a built-in hosted network of the 'Bridge' type, such as vmnet0 is present. If so, then in step 410, the function sets the return value, rv, e.g., to 'vmnet0'. If the type is 'HostOnly', then in step 412, the function determines whether a built-in network of the 'HostOnly' type, such as vmnet1 is present is. If so, then in step 414, the function sets the return value, rv, e.g., to 'vmnet1'. If the type is 'custom', then in step 416, the function determines whether a custom network is available, where the custom network has the values of 'NAT', 'DCHP' and 'connected host' set in a particular manner. If so, then in step 418, the function sets the return value, rv, to 'custom'. If the type of hosted network 132, 133 does not match any of the foregoing hosted network types, then in step 420 the function sets the return value, rv, to 'error'. In step 422, the function returns with the return value, rv, which becomes the value of 'similarHosted.Network' in step 308 of FIG. 3. In an embodiment, the function is carried out by virtualization software 124, 125.

Figure 5:
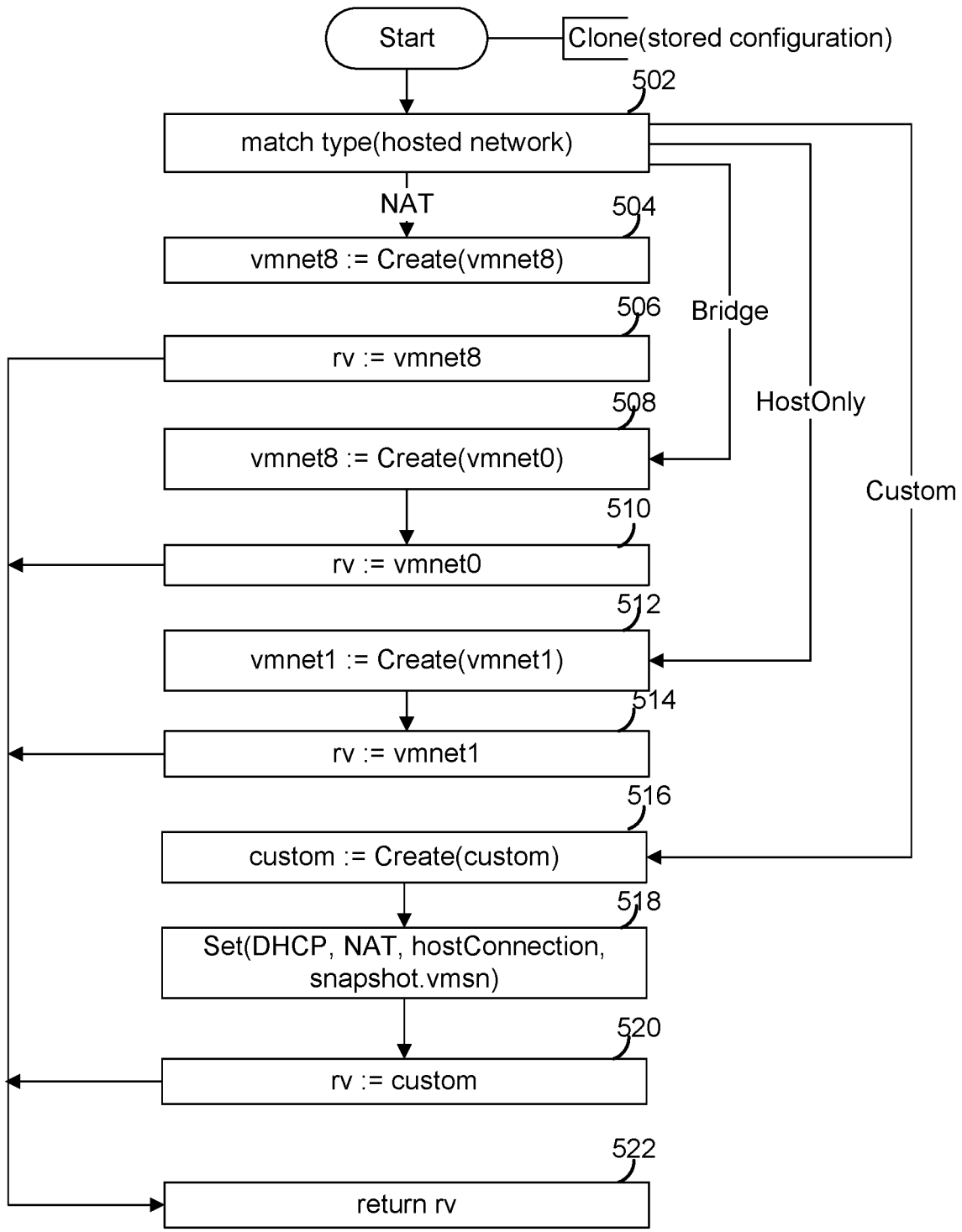
FIG. 5 depicts a flowchart of operations for a function that clones a new hosted network based on a stored configuration, in an embodiment.

FIG. 5 depicts a flowchart of operations for a function that clones/creates a new hosted network based on a stored configuration, in an embodiment. In step 502, the function determines the type of hosted network that needs to be cloned, where cloning includes, in one embodiment, making a new hosted network from a network template and then configuring the new hosted network with the parameters for a particular hosted network type. For example, in certain embodiments, network templates are available for vmnet0, vmnet1, and vmnet8. If the type is 'NAT', then in step 504, the function creates a NAT-type network, e.g., vmnet8-type network, and in step 506 sets the return value, rv, e.g., to 'vmnet8'. If the type is 'Bridge', then in step 508, the function creates a Bridge-type network, e.g., vmnet0-type network, and in step 510, sets the return value to, e.g., 'vmnet0'. If the type is 'HostOnly', then in step 512, the function creates a HostOnly-type network, e.g., vmnet1-type network, and in step 514, sets the return value to, e.g., 'vmnet1'. If the type is custom, then in step 516, the function creates a custom-type network and in step 518 sets the parameters for the custom network. In step 520, the function sets the return value, rv, to 'custom'. In step 522, the function returns with the return value, rv, which becomes the value of 'newHosted.network' in step 314 of FIG. 3. In an embodiment, the function is carried out by virtualization software 124, 125.

Figure 6:
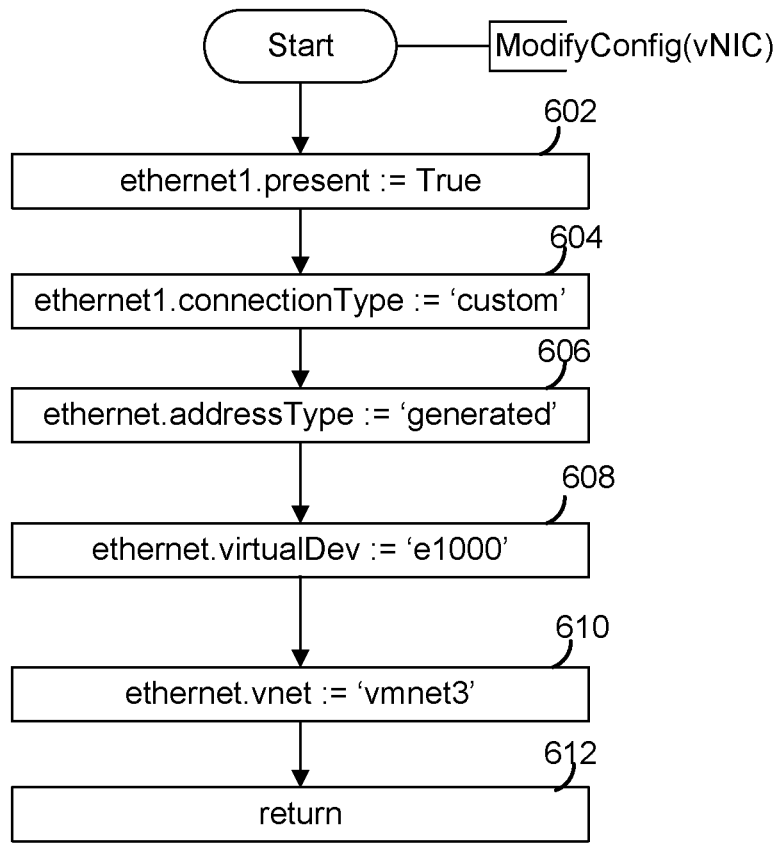
FIG. 6 depicts a flowchart of operations for a function that modifies a vNIC, in an embodiment.

FIG. 6 depicts a flowchart of operations for a function, called in steps 312 and 316 of FIG. 3, which modifies configuration parameters of a vNIC maintained in virtualization software 124, 125, in an embodiment. In the example shown in the figure, the function sets in step 602 the 'ethernet1.present' parameter to 'TRUE', in step 604 the ethernet1.connectionType parameter to 'custom', in step 606, the ethernet.addressType parameter to 'generated', in step 608, the ethernet.virtualDev parameter to 'e1000', and in step 610, the ethernet.vnet parameter to vmnet3 and then returns in step 612 to step 316 of FIG. 3. Thus, the function sets these parameters to values that depend on the particular configuration of the vNIC for either the similar or cloned hosted network.

Thus, a hosted network for a virtual machine can be restored for the virtual machine when the virtual machine is restored, possibly in a new environment. Restoration of the hosted network includes saving additional parameters regarding the configuration of the vNICs of the virtual machine in a snapshot file and then running restoration functions that provide a hosted network that is the same or similar to the hosted network originally used by the vNICs of the virtual machine. The restoration functions include using a similar hosted network if a similar hosted network is available or cloning a hosted network if a similar hosted network is not available. After a suitable hosted network is found or created, the configuration of the vNICs of the virtual machine is altered to work with the found or newly created hosted network.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system. Computer readable media may be based on any existing or subsequently developed technology for embodying computer programs in a manner that enables them to be read by a computer. Examples of a computer-readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims.

Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

The invention claimed is:

1. A method for restoring a virtual machine, the method comprising:
   restoring the virtual machine from a recorded snapshot of the virtual machine, wherein the recorded snapshot includes stored configuration information regarding a hosted network used by the virtual machine, the stored configuration information including parameters that describe properties of the hosted network used by the virtual machine, and wherein the restored virtual machine includes one or more virtual network interface controllers (vNICs) configured to be connected to the hosted network;
   determining whether a host running the restored virtual machine includes any hosted network that is available and includes one or more components of the hosted network that support a configuration of the one or more vNICs of the restored virtual machine, the determination based on return values provided by a function;
   in response to the return values indicating that the host includes any hosted network that is available and supports the configuration of the one or more vNICs, restoring the hosted network used by the virtual machine based on the stored configuration information; and
   in response to the return values indicating that no hosted network of the host is available that supports the configuration of the one or more vNICs, restoring the hosted network used by the virtual machine by:
      finding another hosted network having a type that is equivalent to a type of the hosted network used by the virtual machine; and
      modifying each of the one or more vNICs of the restored virtual machine to operate with the other hosted network.

2. The method of claim 1, wherein modifying each of the one or more vNICs includes setting configuration parameters in a vNIC configuration file.

3. The method of claim 1, wherein finding the other hosted network having the type that is equivalent to the type of the hosted network used by the virtual machine includes:
   determining the type of the hosted network used by the virtual machine based on the configuration information stored in the recorded snapshot;
   determining whether an available hosted network matches the type of hosted network used by the virtual machine; and
   selecting the available hosted network that matches the type of hosted network used by the virtual machine.

4. The method of claim 3,
   wherein the type of the hosted network used by the virtual machine is a custom hosted network, the custom hosted network having one or more parameters specifying characteristics of the custom hosted network; and
   wherein determining whether the available hosted network matches the type of the hosted network used by the virtual machine includes:
      checking the one or more parameters of the custom hosted network to determine whether the available hosted network matches the one or more parameters of the custom hosted network used by the virtual machine; and
      selecting the available hosted network that matches the one or more parameters.

5. The method of claim 1, further comprising if no hosted network of the host is available that supports the configuration of the one or more vNICs of the restored virtual machine;
   cloning a new hosted network based on the stored configuration information in the recorded snapshot; and
   modifying each of the one or more vNICs of the restored virtual machine to operate with the cloned hosted network.

6. The method of claim 5, wherein cloning the new hosted network occurs in response to a determination that none of the available hosted networks has a type that is equivalent to the type of the hosted network used by the virtual machine.

7. The method of claim 5, wherein cloning the new hosted network includes:
   determining the type of the hosted network used by the virtual machine; and
   creating the new hosted network having a type that is the same as the type of hosted network used by the virtual machine.

8. The method of claim 1, further comprising capturing a state of the virtual machine to generate the recorded snapshot, wherein capturing the state includes capturing data of the virtual machine at a specific point in time, the data including the stored configuration information.

9. The method of claim 8, wherein the data further includes one or more virtual disks associated with the virtual machine and a virtual memory associated with the virtual machine.

10. A host computer system comprising:
    memory that is loaded with virtualization software for running one or more virtual machines, each virtual machine including a virtual network interface controller (vNIC) that connects to a virtual switch; and
    one or more CPUs for running the virtualization software, the one or more virtual machines, the vNICs, and the virtual switch;
    wherein the virtualization software running on the host computer system is configured to:
       restore the virtual machine from a recorded snapshot of the virtual machine, wherein the recorded snapshot includes stored configuration information regarding a hosted network used by the virtual machine, the stored configuration information including parameters that describe properties of the hosted network used by the virtual machine, and wherein the restored virtual machine includes one or more virtual network interface controllers (vNICs) configured to be connected to the hosted network;

determine, based on return values provided by a function, whether a host running the restored virtual machine includes any hosted network that is available and includes one or more components of the hosted network that support a configuration of the one or more vNICs of the restored virtual machine;

in response to the return values indicating that the host includes any hosted network that is available and supports the configuration of the one or more vNICs, restore the hosted network used by the virtual machine based on the stored configuration information; and in response to the return values indicating that no hosted network of the host is available that supports the configuration of the one or more vNICs:
find another hosted network having a type that is equivalent to a type of the hosted network used by the virtual machine; and
modify each of the one or more vNICs of the restored virtual machine to operate with the other hosted network to restore the hosted network used by the virtual machine.

11. The host computer system of claim 10, wherein the virtualization software, being configured
to modify each of the one or more vNICs of the restored virtual machine, is further configured to set configuration parameters in a vNIC configuration file.

12. The host computer system of claim 10,
wherein the type of the hosted network used by the virtual machine is a custom hosted network, the custom hosted network having one or more parameters specifying characteristics of the custom hosted network; and
wherein the virtualization software, being configured to determine whether an available hosted network matches the type of the hosted network used by the virtual machine, is further configured to:
check the one or more parameters of the custom hosted network to determine whether the available hosted network matches the one or more parameters of the custom hosted network used by the virtual machine; and
select the available hosted network that matches the one or more parameters.

13. The host computer system of claim 10, wherein the virtualization software, being configured to restore the hosted network used by the virtual machine, is further configured to, if no hosted network of the host is available that supports the configuration of the one or more vNICs of the restored virtual machine and none of the available hosted networks has a type that is equivalent to the type of the hosted network used by the virtual machine;
clone a new hosted network based on the stored configuration information in the recorded snapshot;
determine the type of hosted network used by the virtual machine;
create the new hosted network having a type that is the same as the type of hosted network used by the virtual machine; and
modify each of the one or more vNICs of the restored virtual machine to operate with the cloned hosted network.

14. The host computer system of claim 10, wherein the virtualization software is further configured to:
capture a state of the virtual machine to generate the recorded snapshot, the state of the virtual machine comprising data of the virtual machine at a specific point in time, the data including: (i) the stored configuration information, (ii) one or more virtual disks associated with the virtual machine, and (iii) a virtual memory associated with the virtual machine.

15. A computer program product for restoring a virtual machine, the computer program product comprising a non-transitory computer-readable storage medium having computer-readable program code embodied therewith, the computer-readable program code executable by one or more computer processors to:
restore the virtual machine from a recorded snapshot of the virtual machine, wherein the recorded snapshot includes stored configuration information regarding a hosted network used by the virtual machine, the stored configuration information including parameters that describe properties of the hosted network used by the virtual machine, and wherein the restored virtual machine includes one or more virtual network interface controllers (vNICs) configured to be connected to the hosted network;
determine whether a host running the restored virtual machine includes any hosted network that is available and includes one or more components of the hosted network that support a configuration of the one or more vNICs of the restored virtual machine, the determination based on return values provided by a function;
in response to the return values indicating that the host includes any hosted network that is available and supports the configuration of the one or more vNICs, restore the hosted network used by the virtual machine based on the stored configuration information; and
in response to the return values indicating that no hosted network of the host is available that supports the configuration of the one or more vNICs:
find another hosted network having a type that is equivalent to a type of the hosted network used by the virtual machine; and
modify each of the one or more vNICs of the restored virtual machine to operate with the other hosted network to restore the hosted network used by the virtual machine.

16. The computer program product comprising the non-transitory computer-readable storage medium of claim 15, wherein program code, being executable
to modify each of the one or more vNICs of the restored virtual machine, is further executable to set configuration parameters in a vNIC configuration file.

17. The computer program product comprising the non-transitory computer-readable storage medium of claim 15;
wherein the type of the hosted network used by the virtual machine is a custom hosted network, the custom hosted network having one or more parameters specifying characteristics of the custom hosted network; and
wherein the program code, being executable to find another hosted network having a type that is equivalent to a type of the hosted network used by the virtual machine, is further configured to:
check the one or more parameters of the custom hosted network to determine whether the available hosted network matches the one or more parameters of the custom hosted network used by the virtual machine; and
select the available hosted network that matches the one or more parameters.

18. The computer program product comprising the non-transitory computer-readable storage medium of claim 15, wherein the program code, being executable to restore the hosted network used by the virtual machine, is further executable to, if no hosted network of the host is available that supports the configuration of the one or more vNICs and none of the available hosted networks has a type equivalent to the type of the hosted network of the virtual machine;
    clone a new hosted network based on the stored configuration information in the recorded snapshot;
    determine a type of hosted network used by the virtual machine;
    create the new hosted network having a type that is the same as the type of hosted network used by the virtual machine; and
    modify each of the one or more vNICs of the restored virtual machine to operate with the cloned hosted network.

19. The computer program product comprising the non-transitory computer-readable storage medium of claim 15, wherein the program code is further executable to:
    capture a state of the virtual machine to generate the recorded snapshot,
    the state of the virtual machine comprising data of the virtual machine at a specific point in time, the data including: (i) the stored configuration information, (ii) one or more virtual disks associated with the virtual machine, and (iii) a virtual memory associated with the virtual machine.

* * * * *